United States Patent
Schuler et al.

(10) Patent No.: US 11,132,756 B2
(45) Date of Patent: Sep. 28, 2021

(54) METHOD AND SYSTEM TO ASSOCIATE THE IOT DEVICES WITH AN INCIDENT AND MANAGE ACCESS

(71) Applicant: MOTOROLA SOLUTIONS, INC, Chicago, IL (US)

(72) Inventors: Francesca Schuler, Palatine, IL (US); Bradley M. Hiben, Glen Ellyn, IL (US); Thomas S Messerges, Schaumburg, IL (US); Eric Johnson, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 431 days.

(21) Appl. No.: 16/021,160

(22) Filed: Jun. 28, 2018

(65) Prior Publication Data

US 2020/0005415 A1 Jan. 2, 2020

(51) Int. Cl.
*G06Q 50/26* (2012.01)
*G06F 16/955* (2019.01)
*H04L 29/08* (2006.01)
*H04W 4/021* (2018.01)

(52) U.S. Cl.
CPC ....... *G06Q 50/265* (2013.01); *G06F 16/9566* (2019.01); *H04L 67/02* (2013.01); *H04L 67/12* (2013.01); *H04W 4/021* (2013.01)

(58) Field of Classification Search
CPC combination set(s) only.
See application file for complete search history.

(56) References Cited

U.S. PATENT DOCUMENTS

| | | | |
|---|---|---|---|
| 2014/0187190 A1* | 7/2014 | Schuler | H04W 12/084 455/404.1 |
| 2014/0359035 A1 | 12/2014 | Wang et al. | |
| 2015/0288694 A1* | 10/2015 | Liebl, III | H04L 63/0884 713/182 |
| 2016/0088463 A1* | 3/2016 | Stanke | H04W 8/18 455/404.1 |

(Continued)

OTHER PUBLICATIONS

The International Search Report and The Written Opinion corresponding patent application serial No. PC/US2019/038408 filed Jun. 21, 2019, dated Sep. 26, 2019, all pages.

*Primary Examiner* — Dennis W Ruhl
*Assistant Examiner* — Donald J Edmonds

(57) ABSTRACT

A method for registering an Internet of Things (IoT) device to an incident IoT ledger system is provided. A computer aided dispatch (CAD) device sends a first ledger request including an incident record to a distributed incident ledger operated by validation nodes. The CAD device receives a first ledger response indicating that the incident record was accepted and added into the incident ledger after being validated by the nodes. The CAD device then sends a second ledger request to an IoT distributed ledger operated by second validation nodes. The request includes a query to the IoT distributed ledger to find registered IoT devices for affiliating with the incident. The CAD device receives a second ledger response including information identifying registered IoT devices from the IoT distributed ledger. The CAD device then sends an affiliation invitation to an IoT device determined from the registered IoT devices identified in the second ledger response.

13 Claims, 5 Drawing Sheets

(56) References Cited

U.S. PATENT DOCUMENTS

| | | | |
|---|---|---|---|
| 2016/0379472 A1* | 12/2016 | Schuler | H04W 52/0254 |
| | | | 340/539.11 |
| 2017/0099579 A1* | 4/2017 | Ryan | H04M 3/5116 |
| 2017/0187807 A1* | 6/2017 | Clernon | H04L 41/0806 |
| 2017/0262621 A1 | 9/2017 | Venkataraman et al. | |
| 2017/0279774 A1* | 9/2017 | Booz | H04L 63/0421 |
| 2017/0289350 A1* | 10/2017 | Philbin | H04L 67/146 |
| 2017/0331896 A1* | 11/2017 | Holloway | H04L 9/12 |
| 2018/0139056 A1* | 5/2018 | Imai | H04L 9/3236 |

\* cited by examiner

METHOD AND SYSTEM TO ASSOCIATE THE IOT DEVICES WITH AN INCIDENT AND MANAGE ACCESS

BACKGROUND OF THE INVENTION

IoT (Internet of Things) devices, such as sensors and cameras, may be owned by private companies, such as gas stations, convenience stores, etc., or governmental entities, such as public safety facilities, public works departments, etc.

Incidents occur at specific locations. The incidents can be, for example, public safety incidents or utility incidents. Oftentimes public safety officers would benefit from additional information about incidents. For example, video footage from an IoT device such as a video camera that may have video footage of the incident.

However, IoT devices are owned and managed by various disparate entities, which makes accessing and obtaining information from them difficult. One problem is determining which IoT devices might have pertinent information about an incident. Second, it is difficult to manage access to these IoT devices. Lastly, it is difficult to authenticate to and control these devices, since many are owned by non-governmental entities.

Therefore, a need exists for a way of obtaining helpful and relevant information from an IoT device pertaining to an incident.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
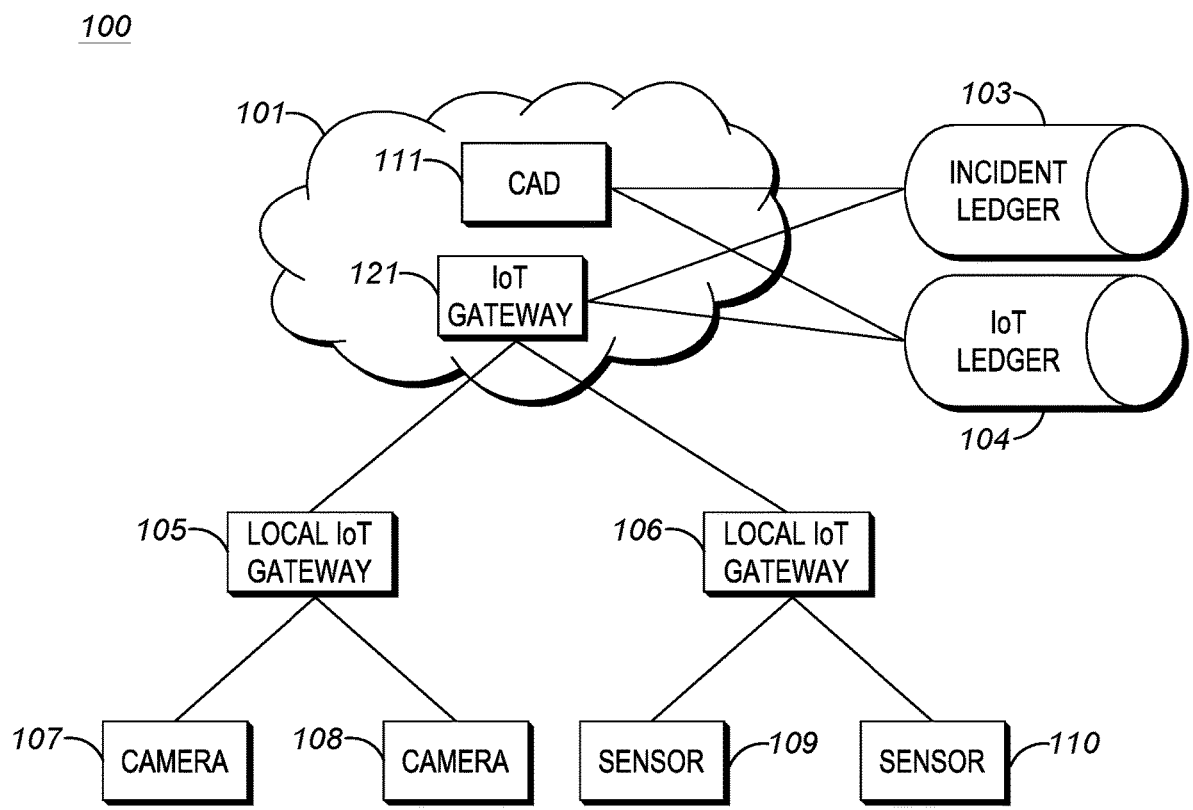
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 depicts a system diagram of a communication system 100 in accordance with an exemplary embodiment of the present invention. Communication system 100 preferably includes communication network 101, incident ledger 103, IoT ledger 104, local IoT Gateways 105 and 106, cameras 107 and 108, and sensors 109 and 110.

Communication network 101 is preferably the Internet. In an alternate exemplary embodiment, communication network 101 is a Computer Aided Dispatch (CAD) system in a public-safety network with a gateway connection to the Internet. Communication network 101 preferably includes Computer Aided Dispatch (CAD) 111 and IoT Gateway 121. The Internet of Things (IoT) is a network of physical devices, vehicles, home appliances and other items embedded with electronics, software, sensors, actuators, and connectivity which enables these objects to connect and exchange data. Each IoT device is uniquely identifiable through its embedded computing system but is able to inter-operate within the existing Internet infrastructure.

CAD 111 is a computer system that assists dispatch personnel and emergency operators, such as 911 operators, in handling and prioritizing emergency calls. In addition, Enhanced 911 systems send the location of the caller to CAD 111, which automatically displays the address of the 911 caller on a screen in front of the emergency operator. CAD 111 is connected to Incident Ledger 103 and IoT Ledger 104.

Complaint information can be entered into CAD 111 and can be easily retrieved. Utilizing CAD 111, operators in a dispatch center are able to easily view and understand the status of all units being dispatched. CAD 111 provides displays and tools so that the dispatcher and other emergency personnel have an opportunity to handle emergency calls as efficiently as possible.

IoT Gateway 121 is a server that is coupled to a plurality of local IoT gateways, such as Local IoT Gateways 105 and 106. IoT Gateway 121 is capable of processing and routing data from a plurality of IoT devices.

Incident ledger 103 and IoT ledger 104 are data repositories including agreed upon, replicated, shared, and synchronized digital data spread geographically across multiple sites, countries, or institutions. A peer-to-peer network is required, as well as consensus algorithms, to ensure that an agreed upon replication of the data across nodes is undertaken. One form of incident ledger design is the blockchain system.

Incident ledger 103 may comprise a network of nodes that maintain the incident ledger. Information in incident ledger 103 preferably includes a description of the current and past incidents handled by the CAD system, including an incident type or ID, a location, geofence coordinates, along with IDs of registered entities assigned to or associated with the incident that should have access to the incident information.

There are many benefits to using incident ledger 103. Incidents can be created by and assigned to any one or more agencies and no single agency would be trusted to host a centralized website. In addition, incident ledger technology allows for all agencies to work together and manage a ledger without creating a single point of failure or attack. Further, agencies do not need to rely on another agency to keep the website secured.

In addition, an exemplary embodiment allows IoT nodes to be registered with a distributed ledger. This could be referred to as a centralized approach. This embodiment would preferably include a different ledger, for example, IoT ledger 104, that maintains a registration of all IoT devices, regardless of who manufactures them, who installs them, or who maintains them. In this embodiment, a CAD system queries this ledger to find out the best IoT devices to affiliate with an incident.

IoT ledger 104 may comprise a network of nodes that maintain the IoT ledger. Information in IoT ledger 104 preferably includes a parameter associated with the registered IoT devices, including their location, recording retention period, field of view, coverage map, resolution, and environment, such as whether the IoT device is located indoors or outdoors.

There are many benefits to using IoT ledger 104. IoT devices can be purchased and installed any one or more entities and no single entity would be trusted to host a centralized website of IoT devices. In addition, IoT ledger technology allows for all entities managing IoT devices to work together and manage a ledger without creating a single point of failure or attack. Further, entities managing IoT devices do not need to rely on another entity to keep the website secured. In an exemplary embodiment IoT nodes directly, or indirectly, for example via an IoT gateway 121 or local IoT gateway 105 or 106, register with IoT ledger 104.

In a further exemplary embodiment, a ledger that an IoT Gateway writes to indicates that an IoT device wishes to affiliate to an incident. Nodes managing a distributed ledger for incidents and affiliations of IoT devices to those incidents could validate a sensor's request to affiliate to an incident, based on information in the distributed ledger that maintains a registration of all IoT devices, for example IoT ledger 104. All of these other ledgers could be combined into one, or maintained separately from each other. The benefits of all of these ledgers would be similar.

Local IoT Gateways 105 and 106 are gateways to sensors. Local IoT gateways 105 and 106 provide connection between IoT devices 107-110 and IoT Gateway 121. In accordance with an exemplary embodiment, an IoT device or Local IoT gateways 105 and 106 registers with or updates the IoT ledger when the IoT device is manufactured, installed, and/or configured.

IoT devices are connected devices that can communicate with other IoT devices in an environment to automate home and industry tasks, and to communicate usable sensor data to users, businesses and other interested parties.

Examples of IoT devices include, but are not limited to, smart TVs, smart speakers, toys, wearables, smart appliances, Smart meters, commercial security systems, smart city technologies, smart air conditioning, smart thermostats, smart lighting, and smart security.

Cameras 107 and 108 are IoT devices that comprise digital cameras. Cameras 107 and 108 can take and store digital images and videos. To enable authentication of IoT devices, such as cameras 107 and 108 and sensors 109 and 110, when an IoT device is manufactured or on first activation, its public key is preferably registered into IoT ledger 104. When the IoT device is installed at a location and attaches to network, it creates and registers a block of GPS data indicating its location to IoT ledger 104. This activation and installation information would be protected with the private key associated with the previously registered public key, so nodes operating IoT Ledger 104, would be able to authenticate the activation and installation information and associate it with a particular IoT device that was previously registered. In accordance with an exemplary embodiment, IoT devices can also update their location after registration.

CAD system 111 can submit a request to Incident Ledger 103 indicating that an IoT device should be affiliated to a particular incident. Nodes operating incident ledger 103 can validate requests to add IoT devices to incidents, for example, by executing a smart contract that validates the location of an IoT device by reviewing information about that IoT Device from the IoT ledger 104. Upon validation, incident ledger 103 will be updated with information indicating that the IoT device has been allowed to be affiliated with the incident.

Sensors 109 and 110 are devices that sense environmental variables and can store and communicate these values to Local IoT Gateway 106. Some examples of sensors include, but are not limited to, temperature sensors, humidity sensors, proximity sensors, pressure sensors, water quality sensors, chemical sensors, gas sensors, smoke sensors, IR sensors, level sensors, image sensors, motion detection sensors, accelerometer sensors, gyroscope sensors, audio sensors, and optical sensors. Sensors 109 and 110 can also be attached to or associated with a public safety officer or equipment. Examples include wearable cameras, vehicular cameras and sensors. Such mobile sensors may be associated with people or equipment known to be assigned to an incident, and they can be requested to affiliate to an incident. Further, these sensors are mobile and as the location of these sensors change, they can become affiliated with incidents associated with their new location.

Figure 2:
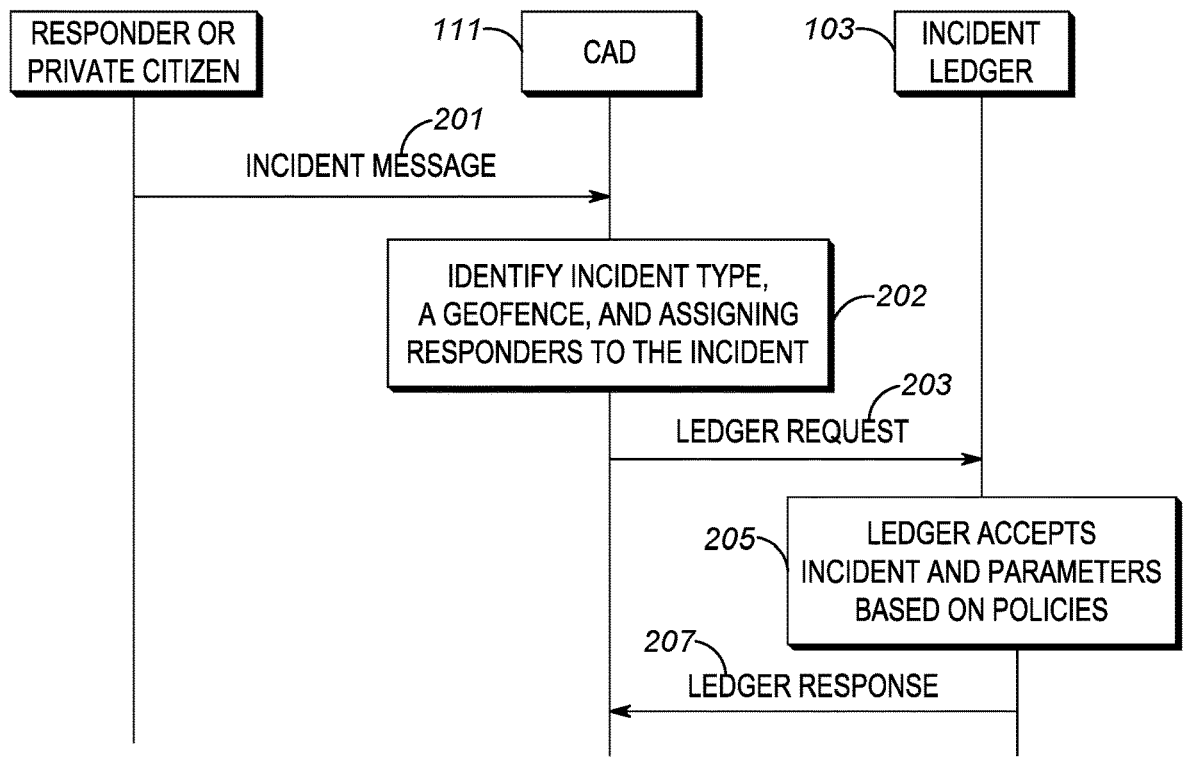
FIG. 2 depicts a call flow in accordance with an exemplary embodiment of the present invention.

FIG. 2 depicts a call flow 200 in accordance with an exemplary embodiment of the present invention.

Upon receiving a call about an incident from a responder or third party, a responder or private citizen sends Incident Message 201 to CAD 111. Incident Message 201 includes the location of the incident and a description of the incident. Based on verified location of officer, an officer's sensors can be registered with an incident to which they are near. In a first exemplary embodiment, the officer's sensors are affiliated based on a centralized embodiment. In a second exemplary embodiment, the officer's sensors are affiliated based on a distributed embodiment.

CAD 111 executes (202) the steps of identifying the incident type and a geofence associated with the location of the incident. CAD 111 preferably assigns responders to the incident. In accordance with an exemplary embodiment, the incident information includes an incident type or ID, a location, geofence coordinates, along with IDs of registered entities assigned to or associated with incident that should have access to the incident information. In an exemplary embodiment, the geofence is dynamic if the responders are in motion, for example during a chase. A dynamic geo-fence is preferably defined as a fixed set of coordinates, but in addition as a range within the vicinity of responders assigned to an incident. As the geo-fence boundary changes, the list of IoT devices affiliated with the incident may be increased or decreased with new devices that become in range or go out of range of this new/dynamic geo-fence, and updated and maintained as the incident progresses.

CAD 111 sends Ledger Request 203 to Ledger 103. In an exemplary embodiment, ledger request 203 is sent to the validation nodes that maintain Ledger 103. In this exemplary embodiment, Ledger 103 is the Ledger System that encompasses the nodes that maintain and keep copies of the ledger. Ledger Request 203 preferably includes the incident type, the incident location, and geofence information. Ledger 103 adds a ledger entry preferably including the incident ID, the geofence ID, and the responder ID. The ledger entry can also include registered entities associated with the incident that have access or should be allowed to have access to data, media, and IoT-provided data and media associated with the incident.

Ledger 103 responds with Ledger Response 207 to CAD 111 indicating whether the incident information sent in Ledger Request 203 was accepted by the validation nodes and added into the ledger.

Figure 3:
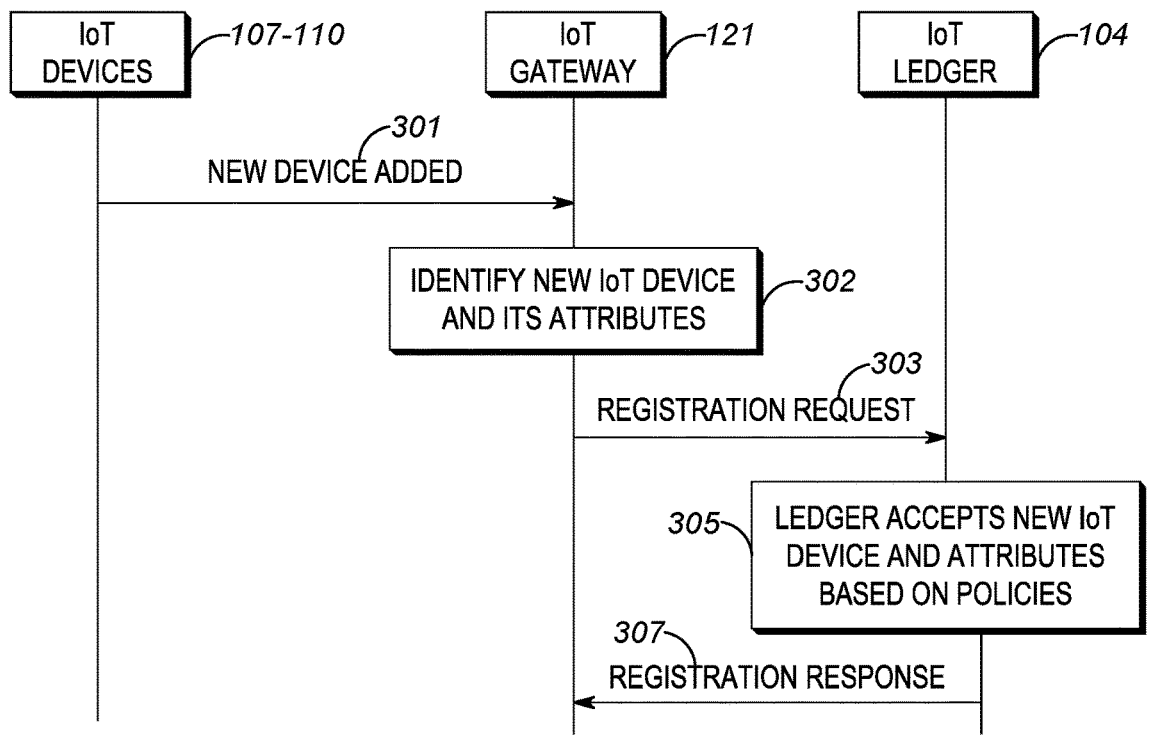
FIG. 3 depicts a call flow in accordance with an exemplary embodiment of the present invention.

FIG. 3 depicts a call flow 300 in accordance with an exemplary embodiment of the present invention.

A new sensor device, such as IoT Device 107-110, being deployed, triggers the New Device Added message 301 being sent to the IoT Gateway 121. It should be understood that any one of these IoT devices can send, or multiple IoT devices can each send a New Device Added 301 message. Alternatively, IoT Gateway 121 can learn of the newly added IoT device via other manual or automated means, such as a installer entering in the information about the new IoT device. However triggered, at step 302, IoT Gateway 121 identifies the new IoT device and its attributes, such as a description of the device, a location of the device, a coverage map, a recording retention period, whether to retain the recording, a field of view angle, a video resolution, and the duration of access to the video. At least one feature of the new IoT device is prevented from functioning until the new IoT device is registered with an IoT ledger 104.

IoT Gateway 121 then sends Registration Request message 303 to the IoT Ledger 104, the Registration Request 303 message conveying one or more of the attributes of the newly added IoT device that were identified at step 302. It should be understood that the IoT Gateway 121 is not required to be present in the system and that any one of the newly added IoT devices can send a Registration Request message 303, or multiple IoT devices can each send a Registration Request 303 message directly to the IoT Ledger 104 without needing IoT Gateway 121.

Upon receipt of a Registration Request 103 message, nodes operating IoT Ledger 104, at step 305 will decide whether to accept the registration request of new IoT device and its attributes, based on policies, for example, enforced by a smart contract. Policies could require that the nodes operating the IoT Ledger 104 validate the IoT attributes, such as by reviewing the submitted information for accuracy and legitimacy. A public key associated with the IoT device can also be registered at this time and used by the nodes operating IoT Ledger 104 to validate future requests from this IoT device that are signed with the corresponding private key.

The result of whether the IoT Ledger 104 accepted or rejected Registration Request 103 is returned via the Registration Response message 307. If the request was accepted, the IoT Ledger 104 is updated with the information and attributes associated with the new IoT device. Upon registering incident-relevant attributes associated with the new IoT device and the location of the new IoT device with the IoT ledger 104, full functioning of the new IoT device is enabled after registration with the IoT ledger 104.

Figure 4:
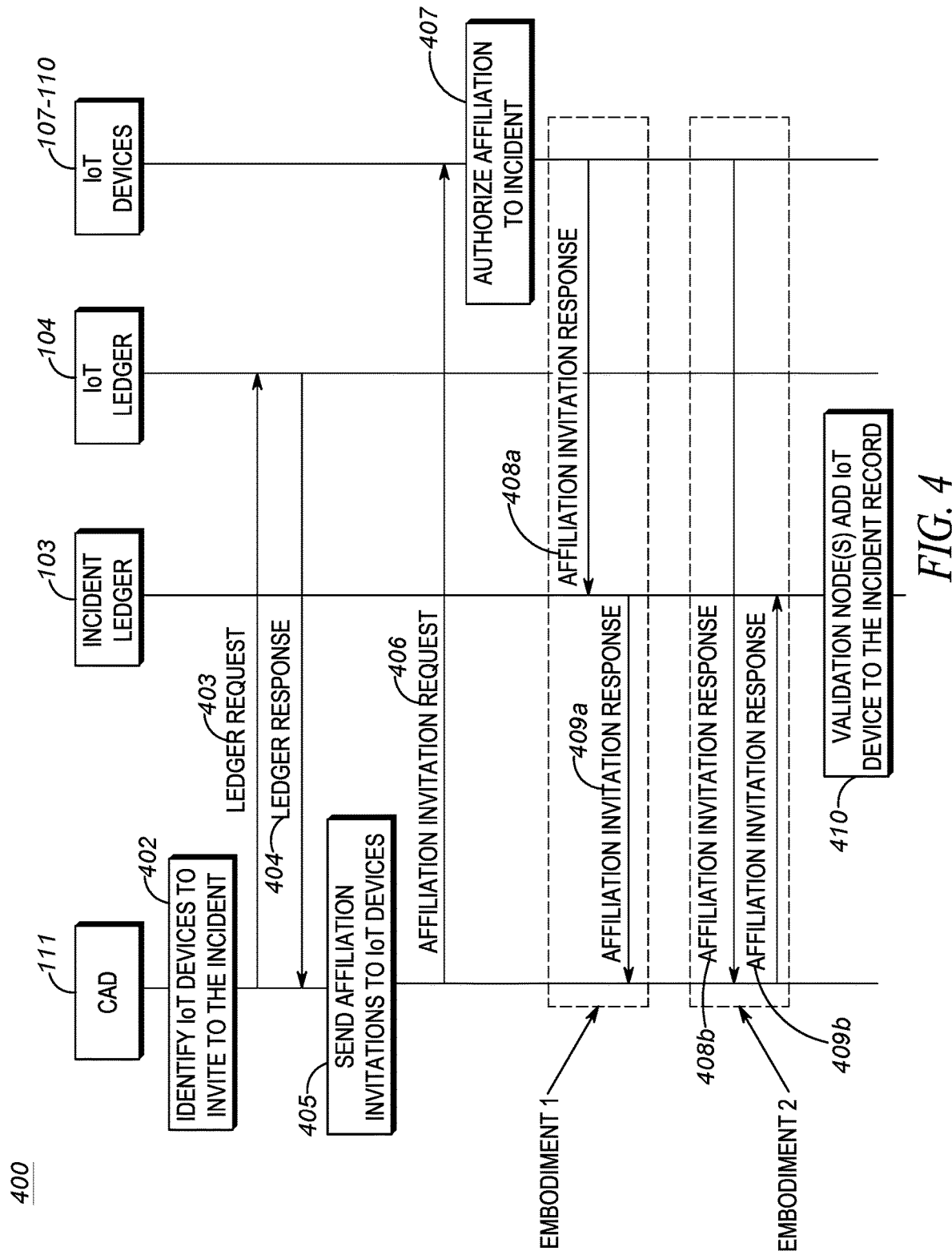
FIG. 4 depicts a call flow in accordance with an exemplary embodiment of the present invention.

FIG. 4 depicts a call flow 400 in accordance with an exemplary embodiment of the present invention.

CAD 111 executes (402) the steps of identifying IoT devices to invite to affiliate with an incident.

CAD 111 sends Ledger Request message 403 to IoT Ledger 104, which represents a query to the ledger to find devices that may be suitable candidates for affiliating with the incident. Suitable candidates may be determined, for example, based on geofence parameters or assigned responders.

Ledger Request message 403 enables CAD 111 to use the IoT distributed ledger 104 to identify IoT devices for affiliation to the incident. CAD 111 includes in its message 403, information such as, Geographic Information System (GIS) data that demarcates geographic areas like beats, zones, sectors, etc. which could be used to filter for groups of known IoT devices in particular areas. CAD 111 also includes information about first responders and equipment assigned to the incident, which could help identify IoT devices assigned to those responders or equipment, including body worn cameras associated with a responder or a car mounted camera associated with a first responder vehicle.

IoT Ledger 104 responds by sending Ledger Response message 404 to CAD 111. Included with this response 404 will be information that identifies one or more potential IoT devices that may prove helpful to handling the incident. Ledger response 404 preferably includes a URL and an alias associated with the one or more identified IoT device.

CAD 111 executes (405) the steps of sending affiliation invitations to the identified IoT devices. CAD 111 sends Affiliation Invitation Request messages 406 to IoT Devices 107-110. It should be recognized that these invitation request 406 messages are sent either directly to the IoT device or to the IoT gateway responsible for managing the IoT device. Each invitation preferably contains an incident ID, which the IoT device (or the gateway responsible for handling the IoT device) will use when executing step 407. During step 407, the IoT device (or its gateway) makes the decision as to whether to authorize the affiliation request to the incident identified by the incident ID. This decision could be based on the incident ID and whether the IoT device is capable of providing support for the incident referenced by that incident ID. For example, the IoT device or gateway could use the incident ID to look up the incident information in Incident Ledger 103 to make its affiliation authorization decision. In accordance with an exemplary embodiment, this authorization is only given if the specific IoT Device has commonality with at least one characteristic of the incident.

In accordance with a first exemplary embodiment, at least one of the IoT Devices 107-110 sends Affiliation Invitation Response message 408a to Incident Ledger 103 or in a second exemplary embodiment sends Affiliation Invitation Response message 408b to CAD 111. These messages trigger either message 409a or 409b, respectively. Hence, in either case, both CAD 111 and Incident ledger 103 are informed of the desire for the one or more IoT devices to affiliate with the incident, this affiliation request having been triggered by the affiliation invitation request 406.

Messages 408a, 409a or 408b and 409a trigger step 410 to be executed at Incident Ledger 103. At step 410, the nodes operating Incident ledger 103 validate the affiliation request and if the one or more IoT devices has commonality with at least one characteristic of the incident, for example, it is in the geofence boundary of the incident or it is associated with a responder assigned to the incident, the one or more IoT devices will be added to the incident. A smart contract executed by the nodes operating Incident ledger 103, will handle validating the request to add the one or more IoT devices to an incident by using information about the IoT device, perhaps submitted by the IoT device in message 408a, 409b or retrieved from IoT ledger 104, and information about the incident from Incident ledge 103. When one or more IoT devices are added to an incident, preferably a URL and an alias associated with the one or more identified IoT device will be added to the record for the incident in Incident ledger 103.

Figure 5:
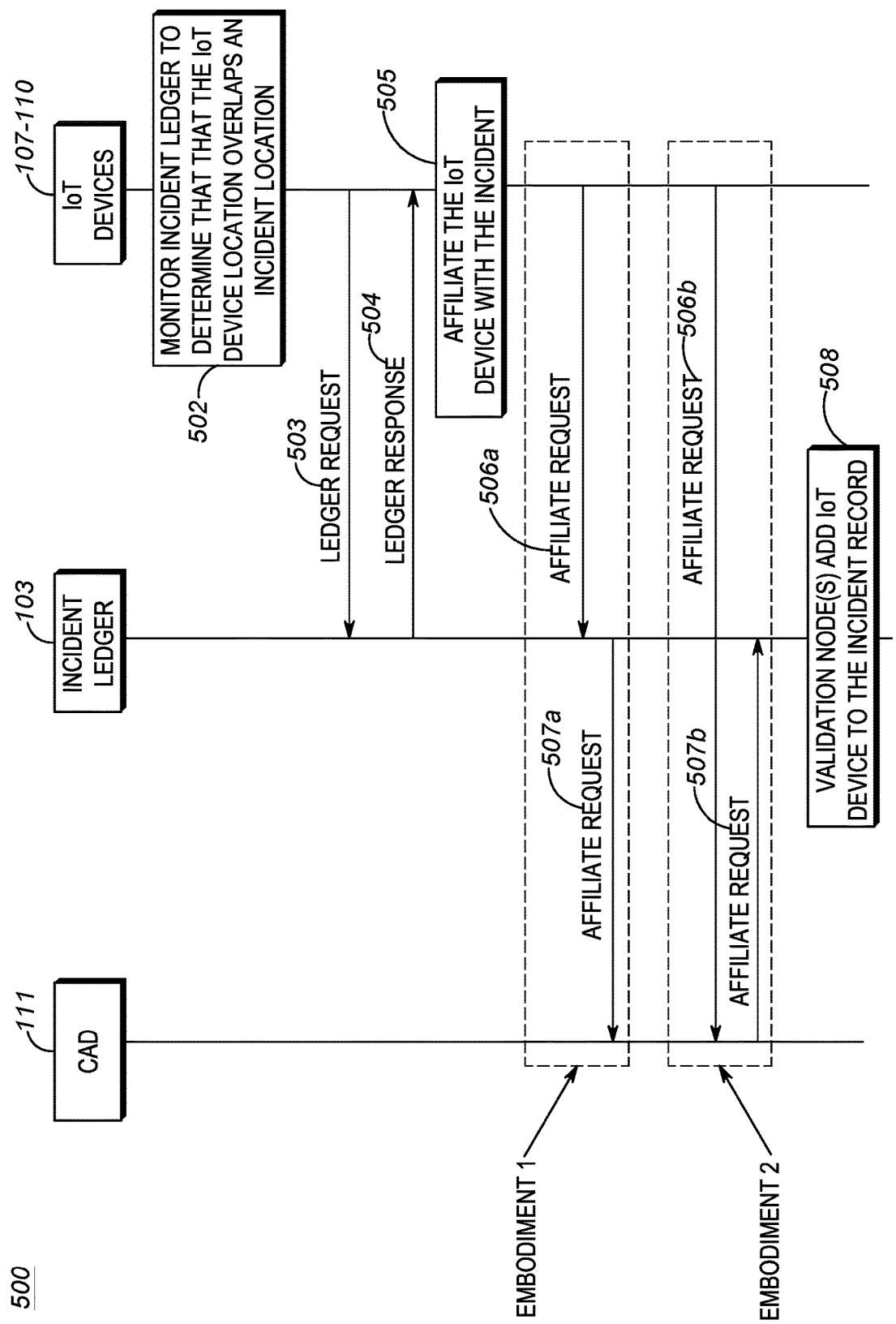
FIG. 5 depicts a call flow in accordance with an exemplary embodiment of the present invention.

FIG. 5 depicts a call flow 500 in accordance with an exemplary embodiment of the present invention.

Each IoT Device 107-110 (or their representative IoT Gateway 121) executes (502) the steps of monitoring the incident ledger to determine that if an IoT device's location overlaps an incident location, either by virtue of the IoT device's actual location or the IoT device's association with a responder that is assigned to the incident.

Each IoT Device 107-110 (or their representative IoT Gateway 121) sends Ledger Request message 503 to Incident Ledger 103 to query for incidents that offer potential for affiliation.

Incident Ledger 103 sends Ledger Response message 504 to the originating IoT Devices 107-110 (or their representative IoT Gateway 121), message 504 containing a list of potential incidents to which one or more of the Devices 107-110 may be of some assistance.

The IoT Devices 107-110 (or their representative IoT Gateway 121) that receive Ledger Response message 504 execute (505) the steps of affiliating the IoT Devices 107-110 with the incident.

The affiliation of an IoT Device should be communicated to both Incident Ledger 103 and to CAD 111. In a first exemplary embodiment, the affiliated IoT Devices 107-110 (or their representative IoT Gateway 121) send Affiliate Request message 506a to Incident Ledger 103. Incident Ledger 103 sends Affiliate Request message 507a to CAD 111 to alert CAD 111 of the IoT Devices that are now affiliated with the incident.

In a second exemplary embodiment, IoT Devices 107-110 (or their representative IoT Gateway 121) send Affiliate Request message 506b to CAD 111. CAD 111 sends Affiliate Request message 507b to Incident Ledger 103 to let Incident Ledger 103 know of the IoT Devices that are now affiliated with the incident.

Regardless of whether Incident Ledger 103 received notice of the newly affiliated IoT Devices directly from the IoT Devices as in the first exemplary embodiment or Incident Ledger 103 received notice of the newly affiliated IoT Devices from CAD 111 as in the second exemplary embodiment, Incident Ledger 103 executes (508) the steps of validation node or nodes adding the affiliated IoT Devices to the incident record. At step 508, the nodes operating Incident ledger 103 validate the affiliation request and if the one or more IoT devices has commonality with at least one characteristic of the incident, for example, it is in the geofence boundary of the incident or it is associated with a responder assigned to the incident, the one or more IoT devices will be added to the incident. A smart contract executed by the nodes operating Incident ledger 103, will handle validating the request to add the one or more IoT devices to an incident by using information about the IoT device, perhaps submitted by the IoT device in message 506a, 507b or retrieved from IoT ledger 104, and information about the incident from Incident ledge 103. When one or more IoT devices are added to an incident, preferably a URL and an alias associated with the one or more identified IoT device will be added to the record for the incident in Incident ledger 103.

Figure 6:
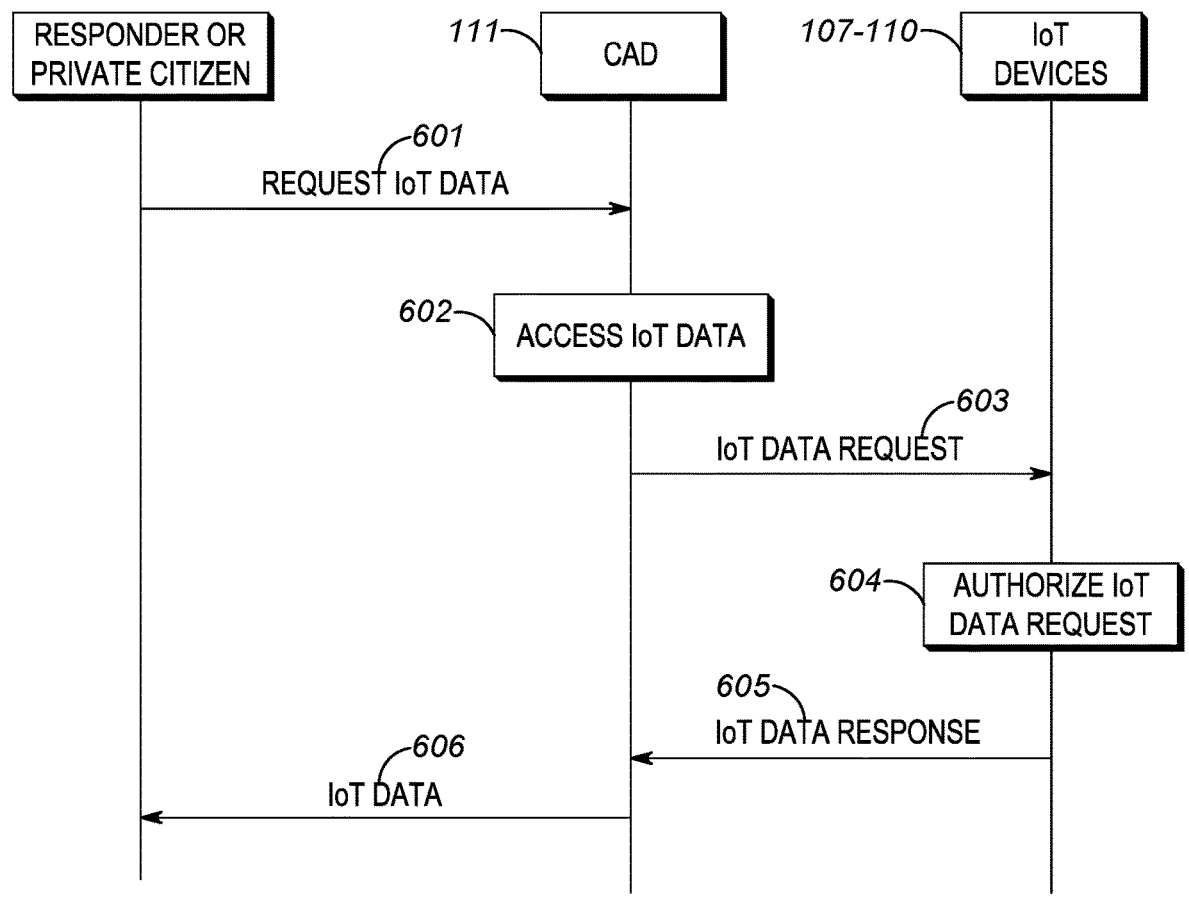
FIG. 6 depicts a call flow in accordance with an exemplary embodiment of the present invention.

FIG. 6 depicts a call flow 600 in accordance with an exemplary embodiment of the present invention.

A responder or private citizen sends a Request IoT Data message 601 to CAD 111.

CAD 111 executes (602) the steps of accessing IoT data.

CAD 111 sends IoT Data Request message 603 to the plurality of IoT Devices 107-110 (or their representative IoT Gateway 121).

Each of the IoT Devices 107-110 execute (604) the steps of authorizing the IoT data request. The IoT device (or its gateway) makes the decision as to whether to authorize the affiliation request to the incident identified by the incident ID. This decision could be based on the incident ID and whether the IoT device is capable of providing support for the incident referenced by that incident ID. For example, the IoT device or gateway could use the incident ID to look up the incident information in Incident Ledger 103 to make its affiliation authorization decision. The IoT device or gateway may also authorize data request by determining that the request is coming from an entity that was assigned to the incident, as indicated in the Incident ledger 103. Only entities assigned to the incident will be granted access.

Each of the IoT Devices 107-110 send IoT Data Response 605 to CAD 111 indicating its authorization decision and, if authorized a representation of the data requested, for example, the video stream taken during the incident.

CAD 111 sends IoT Data message 606, containing the requested data, to the responder or private citizen who originated the initial request.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for adding an incident record to an incident ledger, the method comprising:
    creating, at a computer aided dispatch (CAD) device, an incident record;
    assigning, at the CAD device, attributes to the incident record, the attributes identifying an incident type, an incident location, and one or more responders assigned to an incident;
    sending, at the CAD device, a first ledger request including the incident record to a distributed incident ledger operated by a plurality of validation nodes to maintain incident records of incidents handled by a computer aided dispatch system;
    receiving, at the CAD device, a first ledger response from the distributed incident ledger, the ledger response indicating that the incident record included in the ledger request was accepted and added into the distributed incident ledger after being validated by the plurality of validation nodes;
    sending, at the CAD device, a second ledger request to an Internet of Things (IoT) distributed ledger operated by a plurality of second validation nodes to maintain a list of registered IoT devices to affiliate with an incident, the second ledger request including a query to the IoT distributed ledger to find registered IoT devices for affiliating with the incident, the second ledger request including information identifying a geofence boundary corresponding to the incident location and the one or more responders assigned to the incident;
    receiving, at the CAD device, a second ledger response from the IoT distributed ledger, the second ledger response including information identifying one or more of the registered IoT devices located within the geofence boundary or assigned to the one or more responders assigned to the incident;
    in response to receiving the second ledger response, determining, at the CAD device, an IoT device from the identified one or more of the registered IoT devices to be added to the incident record;
    sending, at the CAD device, an affiliation invitation to the IoT device; and
    receiving, at the CAD device, an affiliation invitation response from the IoT device; and
    in response to receiving the affiliation invitation response, forwarding, at the CAD device, the affiliation invitation response to the distributed incident ledger to enable the validation nodes maintaining the distributed incident ledger to validate if the IoT device is located in the geofence boundary or if the IoT device is assigned to the one or more responders assigned to the incident and to further add the IoT device to the incident record in the distributed incident ledger.

2. The method of claim 1, further comprising:
    receiving, at the CAD device, an IoT data request from a computing device associated with the one or more responders assigned to the incident; and
    forwarding, at the CAD device, the IoT data request to the IoT device to request the IoT device to authorize the IoT data request.

3. The method of claim 2, further comprising:
    receiving, at the CAD device, an IoT data response including IoT data captured by the IoT device during the incident; and
    sending, at the CAD device, an IoT data message containing the IoT data to the computing device associated with the one or more responders assigned to the incident.

4. The method of claim 3, further comprising adding the received IoT data from the IoT device to the incident record in the distributed incident ledger.

5. The method of claim 1, wherein the step of assigning attributes to the incident record comprises assigning an environment to the incident record.

6. A method comprising:
    sending, at an Internet of Things (IoT) device, a ledger request to a distributed incident ledger operated by a plurality of validation nodes to maintain incident records of incidents handled by a computer aided dispatch system, the ledger request including a query for identifying incidents to which the IoT device can be affiliated;

receiving, at the IoT device, a ledger response from the distributed incident ledger, the ledger response identifying an incident to which the IoT device can be affiliated, the ledger response further including attributes associated with the incident;

determining, at the IoT device, whether to affiliate the IoT device to the identified incident based at least in part on the attributes associated with the identified incident;

if it is determined to affiliate the IoT device to the identified incident, sending, at the IoT device, an affiliation request including information identifying the IoT device to the distributed incident ledger to enable the validation nodes operating the distributed incident ledger to validate the affiliation request by using information identifying the IoT device and to add information identifying the IoT device to an incident record associated with the incident in the distributed incident ledger;

receiving a request for IoT data at the IoT device;

validating the request at the IoT device; and if the request is validated, sending IoT data from the IoT device.

7. The method of claim 6, wherein the step of validating the request comprises validating the request using the distributed incident ledger.

8. The method of claim 6, wherein the step of sending an affiliation request comprises sending an affiliation request to the distributed incident ledger via a computer aided dispatch (CAD) device.

9. A method, comprising:

receiving, at an Internet of Things (IoT) distributed ledger operated by a plurality of validation nodes, from an IoT gateway, a registration request of a new IoT device including attributes of the new IoT device, the IoT distributed ledger maintaining a list of registered IoT devices to affiliate with an incident;

determining, at the IoT distributed ledger, whether to accept the registration request of the new IoT device and the attributes of the new IoT device based on predefined policies configured at the IoT distributed ledger;

in response to determining to accept the registration request of the new IoT device and the attributes of the new IoT device, registering the new IoT device by updating the IoT distributed ledger with attributes of the new IoT device and responsively sending a registration response to the IoT gateway;

receiving, at the IoT distributed ledger, from a computer aided dispatch (CAD) device, a ledger request including a query to find IoT devices for affiliating with an incident and further including information identifying a geofence boundary corresponding to an incident location and one or more responders assigned to the incident;

identifying, at the IoT distributed ledger, from the list of registered IoT devices including the new IoT device, one or more IoT devices located within the geofence boundary or assigned to the one or more responders assigned to the incident; and sending, at the IoT distributed ledger, to the CAD device, a ledger response including information identifying the one or more IoT devices identified from the list of registered IoT devices including the new IoT device.

10. The method of claim 9, wherein the attributes of the new IoT device include one or more of: a description of the IoT device, a location of the IoT device, a coverage map, a recording retention period, information indicating whether to retain the recording, a field of view angle, a video resolution, and duration of access to a video captured by the IoT device.

11. The method of claim 9, wherein the ledger response includes a uniform resource locator (URL) and an alias associated with the identified one or more IoT devices.

12. The method of claim 9, further comprising preventing functioning of at least one feature of the new IoT device until the new IoT device is registered at the IoT distributed ledger.

13. The method of claim 9, further comprising enabling full functioning of the new IoT device after registering the new IoT device at the IoT distributed ledger.

* * * * *